United States Patent
Anson

(10) Patent No.: US 8,548,443 B2
(45) Date of Patent: Oct. 1, 2013

(54) SYSTEM AND METHOD FOR SELECTIVELY RESTRICTING PORTABLE INFORMATION HANDLING SYSTEM FEATURES

(75) Inventor: Douglas M. Anson, Dripping Springs, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 13/049,158

(22) Filed: Mar. 16, 2011

(65) Prior Publication Data

US 2012/0238257 A1    Sep. 20, 2012

(51) Int. Cl.
*H04M 3/42*    (2006.01)

(52) U.S. Cl.
USPC ........ 455/414.1; 455/410; 455/411; 455/418; 455/419; 455/420; 455/456.1; 455/456.2; 455/456.3; 455/456.4

(58) Field of Classification Search
USPC ...................................... 455/414.1
See application file for complete search history.

(56) References Cited

U.S. PATENT DOCUMENTS

| | | | |
|---|---|---|---|
| 2004/0203667 A1* | 10/2004 | Schroeder et al. | 455/414.1 |
| 2005/0282559 A1* | 12/2005 | Erskine et al. | 455/456.4 |
| 2006/0205432 A1 | 9/2006 | Hawkins et al. | |
| 2006/0224742 A1 | 10/2006 | Shahbazi | |
| 2008/0214211 A1* | 9/2008 | Lipovski | 455/456.4 |
| 2009/0239587 A1 | 9/2009 | Negron et al. | |
| 2010/0035588 A1* | 2/2010 | Adler et al. | 455/414.1 |
| 2010/0233995 A1* | 9/2010 | Gopalaswamy et al. | 455/410 |

* cited by examiner

*Primary Examiner* — Charles Appiah
*Assistant Examiner* — Mazda Sabouri
(74) *Attorney, Agent, or Firm* — Terrile, Cannatti, Chambers & Holland, LLP; Robert W. Holland

(57) ABSTRACT

Wireless telephones retrieve feature restrictions from a wires telephone network, the feature restrictions having associated predetermined conditions. A wireless telephone applies the feature restrictions if the predetermined conditions are met to disable functions at the wireless telephone as defined by the feature restrictions. For example, a wireless telephone disables camera operations if the position of the wireless phone is in an academic testing location during an academic testing period.

14 Claims, 2 Drawing Sheets

SYSTEM AND METHOD FOR SELECTIVELY RESTRICTING PORTABLE INFORMATION HANDLING SYSTEM FEATURES

BACKGROUND OF THE INVENTION

1. Field of the Invention

The present invention relates in general to the field of managing information handling system features, and more particularly to a system and method for selectively restricting portable information handling system features.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Improved portability of information handling systems has provided increased functionality that is of great interest to end users. Mobile "smart" phones are an example of portable information handling systems that end users have widely adopted. Smart phones include basic telephony functions, such as the ability to place a wireless telephone call through the POTS, plus additional information processing features, such as web surfing, e-mail communication and executing simple applications. A typical smart phone as a tablet configuration with small LCD touchscreen built into a rectangular housing. End users interact with telephone and processing features through the LCD touchscreen, such as with a letter or number keypad displayed on the touchscreen. Many common features are integrated with a touchscreen interface so that an end user can readily perform the features with just a few touches. For example, smart phones often integrate a camera that allows an end user to take pictures by touching a camera icon on the primary user interface to bring up a camera interface and then touching a shutter button on the camera interface to record a picture of an image presented by the camera on the touchscreen. Once an end user has taken a picture, options are often available to send the picture with an email or text message. Another example of a common feature integrated with a touch phone is a GPS receiver that allows an end user to see his current position and to obtain directions with the aid of a map application or Internet interface.

The many features available through a smart phone are sometimes a mixed blessing. For example, in an academic environment smart phones are often an educational aid to students, who can look up information on the Internet to supplement classroom studies. On the other hand, smart phones can quickly become a nuisance to teachers and students alike. In a classroom environment, students who take or make phone calls disrupt the concentration of those around them. Even silent features, such as texting, e-mail and browsing, can lead to disruptions as an end user makes inputs to the smart phone. Vibrations from silent alerts tend to resonate through a classroom environment. Students who manage to use smart phone features without disturbing others still suffer by their own failure to pay attention to lectures and other classroom activities. In some instances, smart phone features are used by students for improper purposes, such as cheating on tests. Smart phones and similar mobile devices have sufficient storage and processing capabilities that students can use the devices for unscrupulous purposes whether or not a network interface is available. When a network interface is available, a student sitting in a test can look up answers using a smart phone browser feature, or can text or e-mail test content and answers with other students, such as a student in a different location who can provide answers. When a network interface is not available, smart phones still have capabilities to record and retrieve information through multiple methods. For example, a smart phone that includes a camera feature allows a student to simply take a picture of a test and send the picture to others or save the picture for distribution at a later time, including distribution to students who have not yet taken the test. As another example, an end user can store answers in a readily accessible location for retrieval during a test. The convenience built into smart phone features tends to make such cheating difficult to detect because a dishonest user has multiple applications, plenty of memory and a small-sized device that allow access to illicit information without drawing attention.

SUMMARY OF THE INVENTION

Therefore a need has arisen for a system and method which support selectively restricting portable information handling system functions.

In accordance with the present invention, a system and method are provided which substantially reduce the disadvantages and problems associated with previous methods and systems for managing the availability of portable information handling system functions. Feature restrictions are selectively enforced at selected of plural portable information handling systems to disable or otherwise restriction functions of the portable information handling systems.

More specifically, in an academic situation, a teacher selectively disables functions of portable telephones of the teacher's students during an academic testing period and in an academic testing location. A function application on each student's portable telephone receives feature restrictions from the teacher that define the functions to be disabled or otherwise restricted and the predetermined conditions under which the functions are restricted. The teacher generates feature restrictions with a feature interface running on a teacher's information handling system, such as a portable telephone or a desktop information handling system and communicates the feature restrictions to the students' portable telephones. When predetermined conditions are met, such as the start of the testing period and a location of a portable telephone in a testing location, the function application applies the feature restriction to disable functions associated with a feature restriction. For example, functions disabled at a portable telephone during an academic test include texting, browsing and taking pictures. Once the predetermined conditions end, such as the testing period ends or the portable phone leaves the testing location, the function application removes the feature restriction to re-enable the disabled functions.

The present invention provides a number of important technical advantages. One example of an important technical advantage is that portable information handling system features are selectively restricted based upon predetermined conditions, such as the location of a smart phone, the time of day, and settings made by a third party. Essential or safety-related features, such as dialing for emergency help, can remain enabled while other features are temporarily disabled because the disabled features can interfere with other activities. For example, a teacher disables texting and non-emergency telephone calls during normal classroom hours if a smart phone is within a limited radius of the physical location of a classroom. During these normal hours, the teacher allows voice memo recording, video recording and pictures so that students can use a smart phone as a note taking aid. During testing periods, the teacher disables smart phone picture features to help prevent cheating by students. Selectively managing smart phone features can provide a useful tool in other situations, such as work situations or parenting situations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Portable information handling systems, such as portable smart telephones, have restrictions selectively placed on functions based upon predetermined conditions, such as a location of a portable phone in an academic testing area during a test time. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
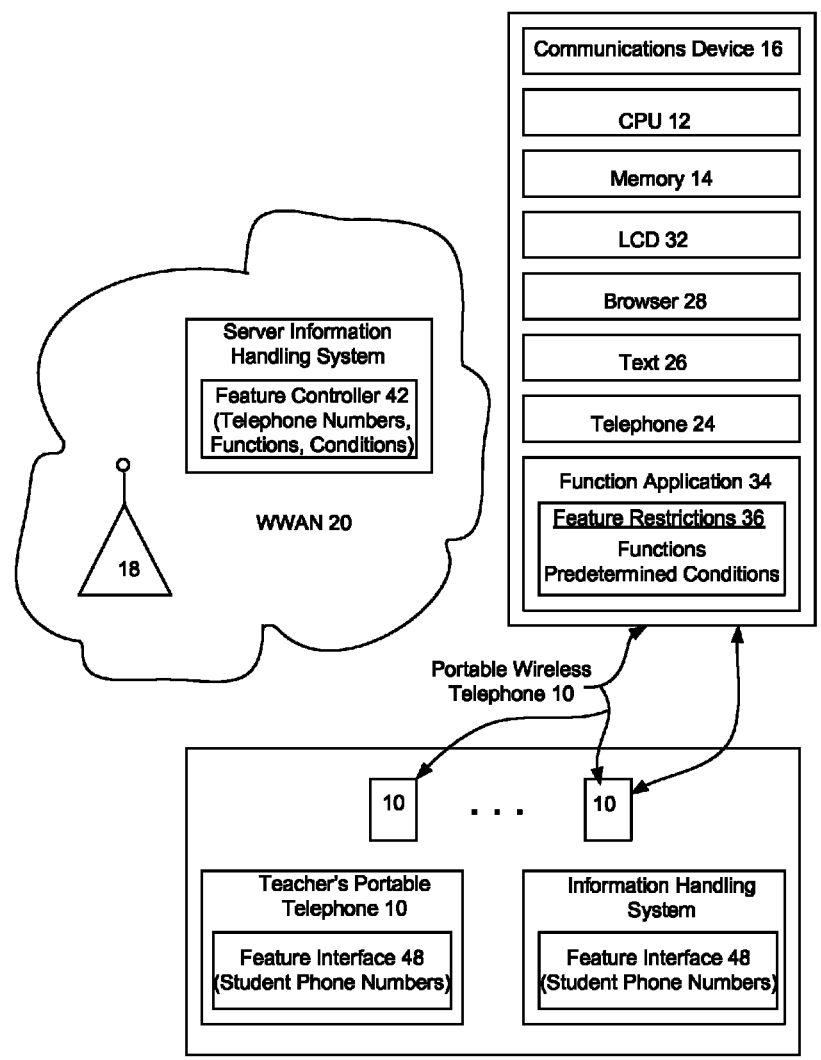
FIG. 1 depicts a block diagram of a system for selectively restricting portable telephone features.

Referring now to FIG. 1, a block diagram depicts a system for selectively restricting portable telephone features. Each portable telephone 10 is essentially a portable information handling system that processes information with processing components, such as with a CPU 12 that executes applications in cooperation with a memory 14. Portable telephone 10 has a communications device 16 that support communication of information to a cell tower 18 of a wireless wide area network 20. For example, communications device 16 communicates voice information to support a telephone call, video information to support a video call, text information to support SMS text messages, and TCP/IP packets to support web browsing. Functions 22 performed by portable telephone 10 are supported by applications running on CPU 12, such as a telephone interface 24, a texting interface 26, a browser interface 28 and device interfaces that support operation of integrated devices, such as a camera 30 that takes pictures and stores the pictures into memory 14. An end user interacts with functions through an LCD 32 that presents images to accept user inputs as touches.

Functions 22 at selected of plural portable telephones are selectively disabled or otherwise restricted by a function application 34 running on CPU 12 based upon feature restrictions 36 received through wireless wide area network 20. For example, a feature restriction 36 includes a set of one or more functions that are disabled under predetermined conditions, such as a defined time period. In a classroom testing example embodiment, portable telephones meeting predetermined conditions of a position within an academic location during a testing period have a feature restriction 36 under which function application 34 shuts down substantially all functionality of portable telephone except emergency calling, such as dialing 911. Functions that are shut down include camera 30 so that pictures cannot be taken of a test, browser 28 that the answers cannot be searched on-line, and texting 26 so that answers or questions cannot be communicated with others. In alternative embodiments, functions may be disabled individually or in different sets based upon settings input by a teacher. For example, PDF readers, word processors, text file readers or other productivity applications that read .doc, .xls, .ppt or similar formats may be disabled to prevent reading cached data. As another example, custom applications may be selectively disabled, such as Google "Human Body" and "Earth" applications to prevent reading cached information. The position of portable telephone 10 within academic location 38 is determined by a GPS function or by other means of locating position, such as WiFi triangulation or WWAN triangulation. Time within an academic testing period is determined from an internal clock or a time signal from wireless wide area network 20. Function application 34 is registered with wireless wide area network 20 for accepting feature restrictions and is installed and secured onto portable telephone 10 so that an administrator must remove the device, thus reducing the risk of cheating by an end user.

Feature restrictions for selected of plural portable telephones 10 are managed through a server information handling system 40 that executes a feature controller 42. Feature controller 42 tracks feature restrictions by a unique identifier, such as a telephone number, and allows access to adjust feature restrictions to authorized individuals through password protection. In the example embodiment of an academic test, prior to the testing time period, each student in the class provides the phone number for their portable telephone 10 and has a function application 34 installed. For instance, the teacher maintains a list of telephone numbers for his students on a desktop information handling system 46 having a feature interface 48 that communicates with feature controller 42. Alternatively, feature interface 48 may be installed on a portable telephone 10 of the teacher. Feature interface 48, whether operating on portable telephone 10 or desktop information handling system 46, dispatches an SMS text message to each students' portable telephone. The text message includes SOAP-based XML content that defines feature restrictions and provides authentication information. In alternative embodiments, alternatives to SMS messages may be used provided sufficient security exists to enable message authentication and validation/repudiation under conventional security principles. In another alternative embodiment, schemas other than SOAP XML may be used to pass information, and other types of authentication may be used, such as pins, passwords, biometrics, certificates, etc. . . . A function application 34 on each student portable information handling system 10 parses the SOAP XML content, authenticates the message and records the testing time and testing location as well as the functions to be disabled during the testing period. When a student's portable telephone 10 enters academic testing location 38, function application 22 recognizes the location and testing time period as the predetermined conditions and disables the functions defined by the feature restriction 36. After the student finishes the test, function application 34 re-enables functions based upon a "release" text message or based upon an end of the predetermined conditions, such as exiting testing location 38 or expiration of the testing period.

Figure 2:
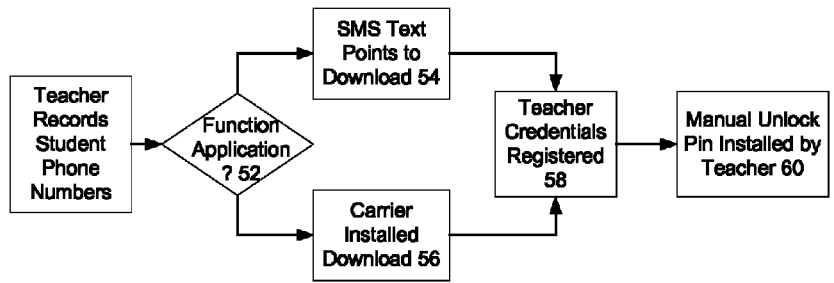
FIG. 2 depicts a flow diagram of a process for enrolling a portable telephone into a restriction system for an academic environment.

Referring now to FIG. 2, a flow diagram depicts a process for enrolling a portable telephone into a restriction system for an academic environment. The process begins at step 50 with a teacher recording a portable telephone number for each student's portable telephone. The teacher can get the telephone numbers directly from the students, from an academic resource, or through the mobile telephone service provider using network-based and non-network based identification processes to enable the teacher to inventory, register, and connect real-time with any number of mobile telephone devices in a location. At step 52, a determination is made of whether each portable telephone has a function application installed to enforce feature restrictions. If not, the teacher sends an SMS text message to the portable telephone to point to a network location for downloading the function application. In some instances, the function application is pre-installed by a portable telephone service provider, such as at manufacture of the portable telephone number or as a precondition to use of cell phone towers in an academic area. At step 58, credentials of the teacher are registered with each function application to authenticate feature restriction requests by the teacher. At step 60, a manual unlock pin is loaded to each function application to enable manual unlocking by the teacher or individual portable telephones.

Figure 3:
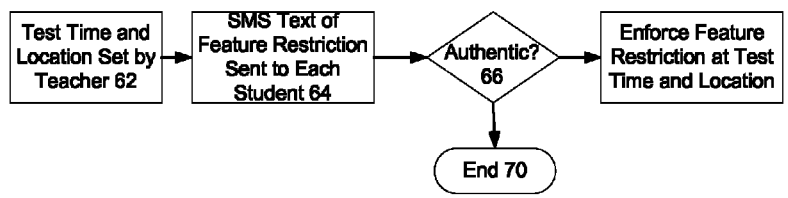
FIG. 3 depicts a flow diagram of a process for activating restrictions at a portable telephone.

Referring now to FIG. 3, a flow diagram depicts a process for activating restrictions at a portable telephone. The process begins with definition of a feature restriction by the teacher, such as the location and time period of an academic test. At step 64, an SMS text message with a secure SOAP-XML message is sent to each student portable telephone through the wireless wide area network to enable the feature restriction. At step 66, the SMS text message authenticated against the teacher's credentials and at step 68, when test time arrives, functions of each student's portable telephone that are associated with the feature restriction are disabled for the testing period in the testing location. If authentication fails at step 66, the process ends at step 70 without enabling the feature restrictions.

Figure 4:
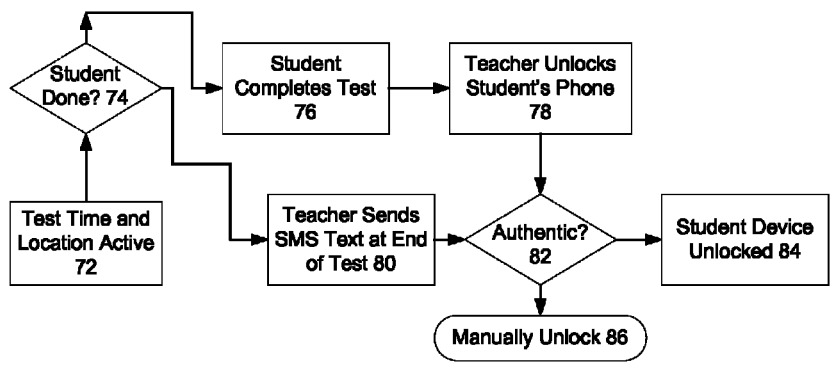
FIG. 4 depicts a flow diagram of a process for releasing restrictions at a portable telephone.

Referring now to FIG. 4, a flow diagram depicts a process for releasing restrictions at a portable telephone. The process starts at step 72 with activation of a feature restriction under the associated predetermined conditions, such as location in a testing area during a testing time. At step 74 a determination is made of whether a student has finished the test prior to the end of a test time period. If yes, the process continues to step 76 with completion of the test by the student and step 78 with an SMS text message by the teacher to unlock the feature restriction at the student's phone so that disabled functions are re-enabled. If the determination at step 74 is no, the process continues to step 80 for the teacher to send an SMS text message that unlocks all student portable phones. Alternatively, the portable phones may unlock automatically once the testing period expires. At step 82, if the SMS text message is authenticated the process continues to step 84 to unlock the portable telephones. If authentication fails at step 82, the process continues to step 86 to have the teacher manually re-enable telephone functions by inputting the PIN code.

Although the example embodiment uses portable telephones, in alternative embodiments, the feature restrictions may be enforced upon other types of portable information handling systems. Feature restrictions may apply to situations other than academic situations and to academic situations other than testing. For example, a teacher may apply feature restrictions to prevent texting in a classroom while allowing web browsing. As another example, an airline may apply feature restrictions to shut off portable telephone transmitters during flights. Although the present invention has been described in detail, it should be understood that various changes, substitutions and alterations can be made hereto without departing from the spirit and scope of the invention as defined by the appended claims.

What is claimed is:

1. A system for selectively restricting portable telephone features, the system comprising:

a feature controller associated with a telephone wireless communication network and operable to accept predetermined feature restrictions for selected of plural portable telephones and to communicate the feature restrictions to the selected portable telephones, each feature restriction restricting performance of one or more portable telephone functions based upon predetermined conditions at each of the selected portable telephones; and a function application stored in memory of the plural portable telephones, the function application operable to receive the feature restrictions at the selected portable telephones and to apply the feature restrictions to disable the one or more portable telephone functions if the predetermined conditions are met;

wherein the predetermined conditions comprise an academic testing location during an academic testing time period, wherein restricting the functions further comprises disabling a camera of the selected portable telephones, wherein the feature restrictions for any given one of the selected portable telephones is unlocked prior to the expiration of the academic testing time period if the portable telephone receives and authenticates a text message to unlock the feature restrictions, and if the authentication fails upon manual input of a code into the portable telephone.

2. The system of claim 1 wherein the one or more portable telephone functions comprises operation of a camera to record images.

3. The system of claim 1 wherein the one or more portable telephone functions comprises web browsing.

4. The system of claim 1 wherein the one or more portable telephone functions comprises substantially all functions except emergency calls.

5. The system of claim 1 further comprising a feature interface operable to accept from an end user the feature restrictions for the selected of plural portable telephones and to communicate the feature restrictions to the feature controller.

6. The system of claim 5 wherein the feature interface comprises a portable telephone.

7. The system of claim 6 wherein the feature interface further comprises a text messaging system at the portable telephone that sends a text message having the feature restrictions to the feature controller.

8. A method for controlling operation of one or more portable information handling systems, the method comprising:
storing feature restrictions for the one or more portable information handling systems at a network location, each feature restriction restricting performance of one or more portable information handling system functions based upon predetermined conditions at each of the one or more portable information handling systems;
sending the feature restrictions from the network location to the one or more portable information handling systems;
detecting the predetermined conditions at a portable information handling system; and
restricting the functions at the portable information handling system in response to the detecting;
wherein the predetermined conditions comprise a location at which an end user of the portable information handling system is scheduled to take a test and a time period during which the end user is scheduled to take the test,
wherein restricting the functions further comprises disabling a camera of the portable information handling systems,
wherein the feature restrictions for any given one of the portable information handling systems is unlocked prior to the expiration of the time period if the portable information handling system receives and authenticates a text message to unlock the feature restrictions, and if the authentication fails upon manual input of a code into the portable information handling system.

9. The method of claim 8 wherein the portable information handling system comprises a portable telephone and restricting the functions further comprises disabling texting at the portable telephone.

10. The method of claim 8 wherein restricting the functions further comprises disabling web browsing of the portable information handling system.

11. The method of claim 8 further comprising:
generating feature restrictions at an information handling system, each feature restriction associated with plural portable information handling system unique identifiers; and
sending the feature restrictions and unique identifiers to the network location.

12. The method of claim 11 wherein the unique identifiers comprise identifiers associated with end user students having a class together and the predetermined conditions comprise the class time period.

13. The method of claim 11 wherein the unique identifiers comprise telephone numbers.

14. A wireless telephone comprising:
a processor operable to process information;
memory interfaced with the processor;
a communications device interfaced with the processor and operable to support communication with a wireless telephone network;
plural functions that execute on the processor of the wireless telephone;
a function application stored in the memory, the function application operable to receive feature restrictions from the wireless telephone network through the communications device and to apply the feature restrictions to disable one or more of the functions if predetermined conditions associated with the feature restrictions are met;
wherein the function comprises operation of a camera to take pictures and the predetermined condition comprises a location of the wireless telephone at an academic testing site during an academic testing time period,
wherein the feature restrictions for the wireless telephone is unlocked prior to the expiration of the academic testing time period if the wireless telephone receives and authenticates a text message to unlock the feature restrictions, and if the authentication fails upon manual input of a code into the wireless telephone.

* * * * *